R. W. LLOYD.
COUPLING AND STEERING DEVICE FOR VEHICLES.
APPLICATION FILED JULY 12, 1917.
1,270,179.
Patented June 18, 1918.
2 SHEETS—SHEET 1.
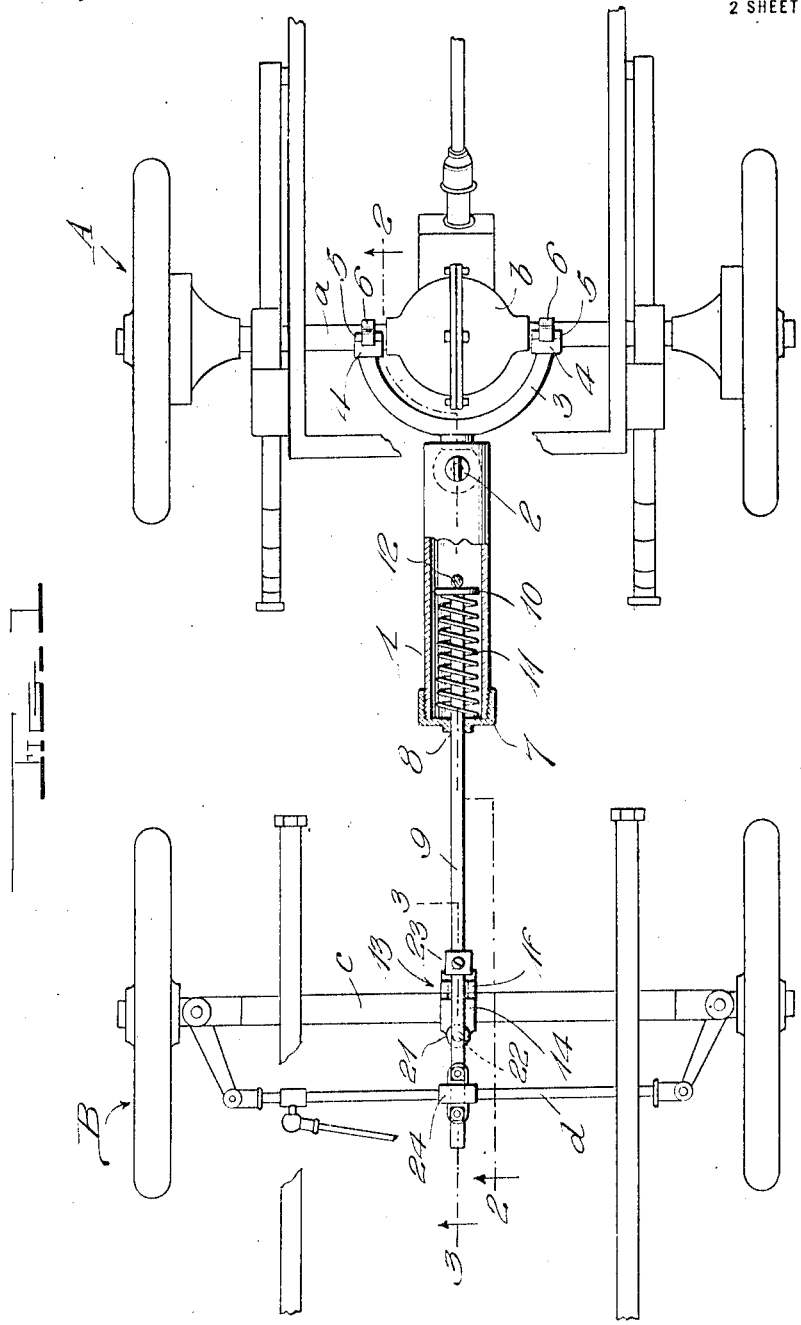
Witness
Inventor
R. W. Lloyd
By H. B. Willson & Co
Attorneys

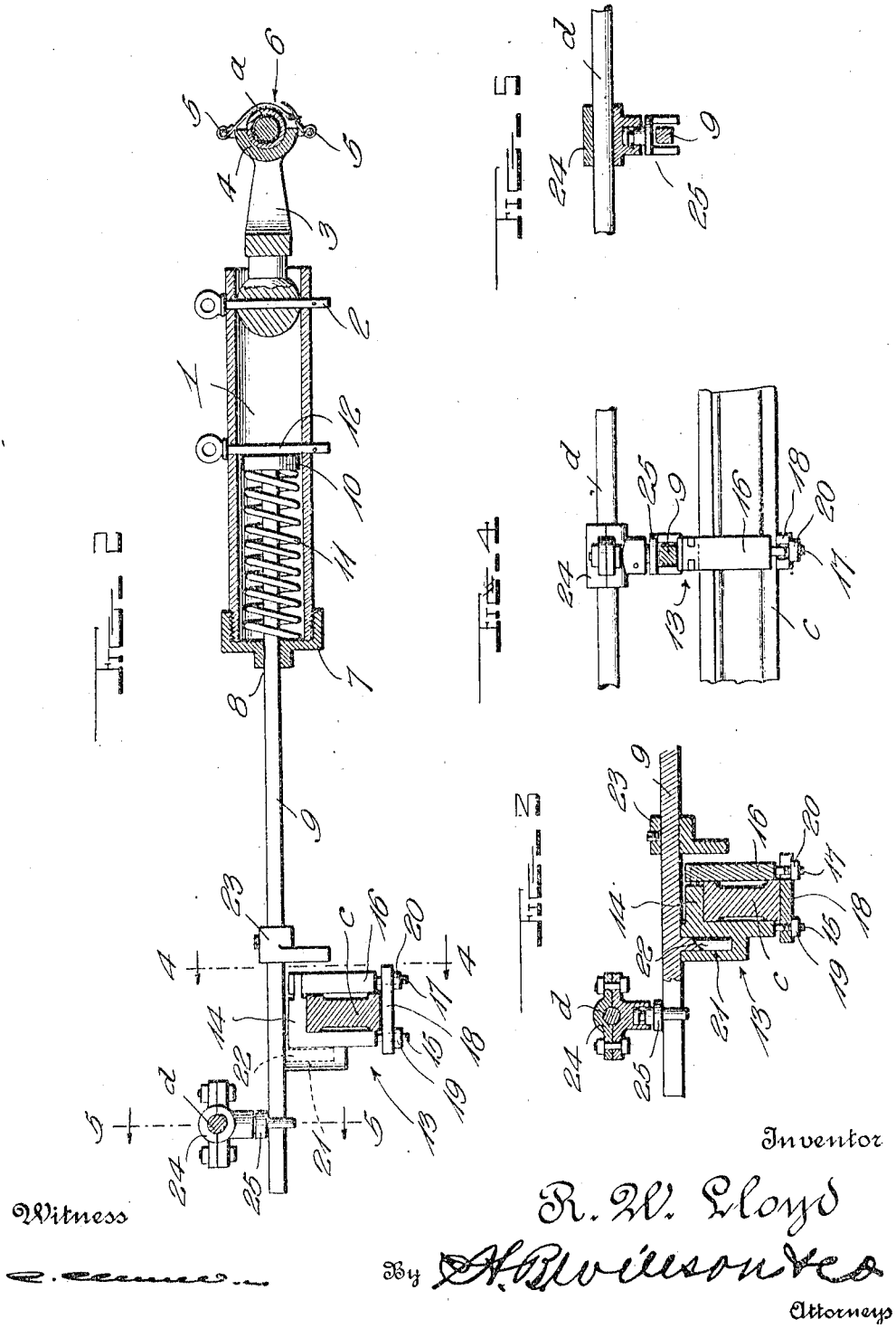

UNITED STATES PATENT OFFICE.

RICHARD WADE LLOYD, OF VERNDALE, MINNESOTA.

COUPLING AND STEERING DEVICE FOR VEHICLES.

1,270,179.

Specification of Letters Patent.

Patented June 18, 1918.

Application filed July 12, 1917. Serial No. 180,179.

*To all whom it may concern:*

Be it known that I, RICHARD WADE LLOYD, a citizen of the United States, residing at Verndale, in the county of Wadena and State of Minnesota, have invented certain new and useful Improvements in Coupling and Steering Devices for Vehicles; and I do declare the following to be a full, clear, and exact description of the invention, such as will enable others skilled in the art to which it appertains to make and use the same.

This invention relates generally to motor vehicle appliances, and more particularly to a new and improved combined coupling and steering device for vehicles.

The primary object of the invention is to provide a device by which a disabled automobile or other vehicle may be towed by another automobile or motor vehicle, the towing or motive car having full control of the disabled or towed car without requiring a driver for the latter.

Another object of the invention is to provide a coupling and steering device for towing a disabled automobile, said coupling device consisting of a rigid member so that the disabled car can be coupled close up to the motive car and thus eliminate the dangers occasioned by the use of a flexible rope or cable.

A further object of the invention is to provide a device of this character which can be easily and readily attached to the vehicle, and which is so constructed that it may be easily taken apart and folded when it is not to be used.

A still further object of the invention is to generally improve upon devices of this class by the provision of a particularly strong, durable, and inexpensive construction, one which will be efficient and reliable in operation, and well adapted to the purpose for which it is designed.

With these and numerous other objects in view, the invention consists of certain novel features of construction, and the combination and arrangement of parts as will be hereinafter fully described and claimed.

In the accompanying drawings forming a part of the application, and in which similar reference characters are used to designate the like parts throughout the several views:—

Figure 1 is a top plan view of portions of two automobiles, showing a device constructed in accordance with this invention applied thereto;

Fig. 2 is an enlarged longitudinal sectional view of the device in operative position upon the automobiles, said view being taken substantially on the line 2—2 of Fig. 1;

Fig. 3 is a detail sectional view taken on the plane indicated by the line 3—3 Fig. 1; and Figs. 4 and 5 are similar views taken on the planes indicated by the lines 4—4 and 5—5 respectively of Fig. 2.

Referring more particularly to the drawings, the letter A designates the rear end of an automobile or other similar vehicle which is provided with a rear axle $a$ having as usual a differential housing $b$ between its ends. B represents the forward end of another automobile or other vehicle, which is provided with the usual front axle $c$ and steering rod $d$, the latter being connected to the stub axle of the front wheels of the vehicle so that upon its movement the stub axles will be swung so as to cause the automobile to be turned to the right or left. These parts form no part of the present invention but are shown and described for the purpose of explaining the application of the device constructed in accordance with this invention.

The reference numeral 1 designates a tubular member, the forward end of which is preferably closed and pivotally connected by means of a removable pin 2 to the intermediate portion of a yoke 3. As shown clearly in Fig. 1 of the drawings the yoke 3 partially encircles the differential housing $b$ of the rear axle of the automobile A, and has its ends removably secured to said axle on each side of said differential housing. The means here shown for doing this consists of substantially semi-circular straps or yokes 4 which are formed integrally with the ends of the yoke 3, preferably joining the ends of said yoke 3 at their intermediate portions. The ends of the straps or yokes 4 are provided with eyes 5, and to these eyes 5 are connected straps 6. These straps 6 may be permanently connected at one of their ends to the uppermost eyes, while at the lower ends they are preferably connected to the lowermost eyes by buckles or other suitable adjustable strap fastenings.

Threaded to the rear end of the member 1 is a cap 7, the latter being provided with a central opening 8 through which extends a tube or bar 9. The forward end of this tube or bar 9 is disposed within the tube or member 1 and is provided with a suitable head 10, between the rear side of which and the interior side of the cap 7 is a coil spring 11. Obviously the coil spring 11 provides a cushioning means between the head of the tube or bar 9 and the cap 7 so as to relieve the various parts of the device of the jar occasioned in starting the vehicle. To prevent the bar 9 from moving forward in the member 1 under the tension of the spring 11 a pin 12 is removably extended through suitable openings in diametrical opposite sides in the member 1. It is to be understood that when the device is to be used the bar 9 is moved rearwardly in the member 1 so that the pin 12 may be inserted in the openings in the latter in advance of the head 10. When however, the device is not to be used but is to be packed away, the pin 12 is to be removed so that the bar 9 may be telescoped within the tubular member 1.

The reference numeral 13 represents as an entirety a clamp which is fitted around the axle $c$ of the vehicle B, the latter being a disabled vehicle which the vehicle A is towing. This clamp 13 comprises a right angular member 14, one of the arms of which is disposed vertically and against the rear side of the axle $c$. Projecting downwardly from the free end of this arm is a threaded stud 15. The other arm of the member 14 extends forwardly over the upper side of the axle $c$ and is forked to properly receive the grooved end of member 16. This member 16 is disposed against the forward side of the axle $c$ and has projecting from its lower end a threaded stud 17. The reference numeral 18 designates the third member of the clamp 13, and this is shown in the form of a bar or strap having an aperture or opening in its rear end through which a stud 15 extends, and a slot in its forward end through which the stud 17 extends. Threaded on the studs 15 and 17 are clamping nuts 19 and 20 respectively. These clamping nuts tightly engage the lower side of the bar 18 and maintain the latter firmly in position, and when so clamped the entire clamp 13 is firmly clamped to the front axle $c$ of the automobile B.

The vertical arm of the member 14 of the clamp 13 is provided with a socket 21. This socket is disposed vertically so as to receive a lug 22 which projects downwardly from the lower side of the tube or rod 9 near the rear end of the same. Thus it will be seen that the rod 9 is fulcrumed at this point. Longitudinally adjustably mounted upon the rod 9 is a collar 23, the latter being disposed near the forward side of the clamp 13 to prevent the latter from working forward.

The reference numeral 24 represents a clamp composed of a pair of substantially U shaped straps. This clamp 24 is fitted upon the steering rod $d$ of the disabled automobile B. Swiveled in any suitable manner to the clamp 24 is an eye or fork 25, the latter being adapted to receive the rear end of the rod 9 so that the rear automobile B will be automatically steered by the front automobile A without requiring a driver for the automobile B.

When the device is in use, the parts are connected to the two cars in the manner above described.

When however, the device is not in use it is disconnected from the clamps 13 and 24 and the rod 9 telescoped within the tubular member 1. The yokes or straps 4 are disconnected from the rear axle $a$ of the automobile A, and the yoke 3 is disconnected from the tubular member 1 by removing pin 2. The clamps 13 and 24 are then removed from the rear automobile and may be packed together in a suitable casing, not shown.

From the foregoing description, taken in connection with accompanying drawings the construction, use and operation of the invention will be readily understood without a more extended explanation. It will be seen that the objects of the invention have been effectively carried out as the device enables a disabled automobile or other vehicle to be towed and automatically steered by another without requiring a separate driver for said towed automobile. In view of the fact that the coupling connecting the two cars together is rigid and short, the dangers which are encountered by the use of a flexible towing rope or cable have been eliminated.

It is obvious that various changes in form, proportion, and in the minor details of construction may be resorted to without departing from the spirit of this invention, and hence I do not wish to be limited to the precise construction herein shown and described.

I claim:—

A combined coupling and steering device for motor vehicles comprising a tubular member having axle engaging means at one end thereof to be connected to the rear axle of a vehicle, a cap threaded upon the other end of said member and having a central opening therein, a rod extending through said opening and having one end disposed in said member and provided with a head, a coil spring surrounding said rod and disposed between said member and said cap, a removable pin extending through said member in advance of said head for limiting the forward movement of said rod, a lug depending from said rod near the rear end thereof, a clamp for attachment to the front axle of another vehicle and provided with a socket to receive said lug, and another clamp to be attached to the steering rod of said other vehicle and provided with means to receive the rear end of said rod.

In testimony whereof I have hereunto set my hand in the presence of two subscribing witnesses.

RICHARD WADE LLOYD.

Witnesses:
E. N. FRAZIER,
W. N. MORELL, Jr.